July 13, 1937.  E. C. GRIBBLE  2,086,799
TRANSIT SHED
Filed June 12, 1936  2 Sheets-Sheet 1

Fig. 1.

Inventor
ERNEST C. GRIBBLE

July 13, 1937.  E. C. GRIBBLE  2,086,799
TRANSIT SHED
Filed June 12, 1936  2 Sheets-Sheet 2
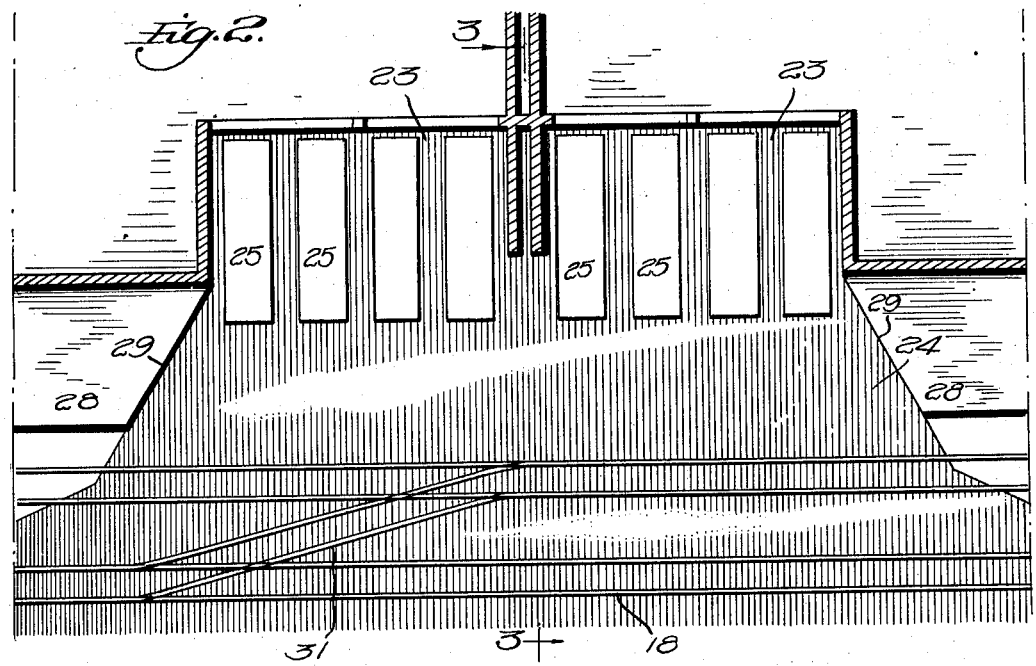
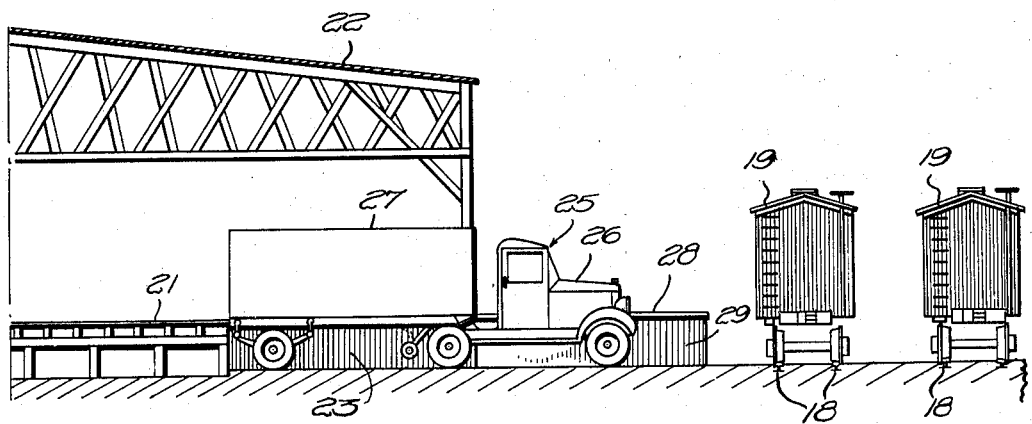
Inventor
ERNEST C. GRIBBLE
By
Attorney Patented July 13, 1937

2,086,799

UNITED STATES PATENT OFFICE 2,086,799

TRANSIT SHED

Ernest C. Gribble, Olympia, Wash.

Application June 12, 1936, Serial No. 84,945

7 Claims. (Cl. 104—29)

This invention relates to transit or terminal sheds for railroad and steamship terminals, and the like.

Before the advent of motor freight vehicles, freight in terminal, transit sheds and the like was handled to some extent by horse-drawn vehicles, the freight being lifted from the level of the shed floor into the vehicle. Freight loaded on and unloaded from railroad freight cars was transported by hand trucks over a platform at the rear of the shed, and in order for the level of the car floor to be the same as the shed floor, the railroad tracks were depressed to the proper extent with respect to the transit shed, so that freight could be trucked directly into and out of a freight car. When freight to be loaded or unloaded from horse-drawn vehicles was too heavy to be conveniently handled manually, it became the practice to back such vehicles against the railroad platform at the rear of the shed, thus placing the level of the floor of the vehicle body approximately at the same point as that of the shed floor, thus lessening the labor necessary to load and unload the drays.

With the rapid development of motorized freight vehicles, there has been a steady increase in the amount of freight handled to and from ocean terminals by such vehicles, the use of railroad freight cars for this purpose being decreased until at the present time approximately 75 per cent. of the package freight is transported to and from ocean terminals by motor trucks. In most instances the floors of truck bodies are arranged substantially at the height of the floors of railroad cars, thus facilitating the handling of freight between the floor of a transit shed and the floor of a motor truck body. The development of terminal transit sheds has not kept pace with the development and use of motor drays, and in handling freight on the same level between a transit shed and a motor truck body, it has been the common practice for several years to back a motor dray across the railroad tracks to deliver freight to the floor of a transit shed and receive freight therefrom. The result is that it is frequently necessary to move motor drays when shifting freight cars, thus creating a situation which is not only dangerous to property and personnel but decreases to a great degree the efficiency of motor drays in handling freight, because of the delay resulting from the moving of the trucks when switching railroad cars.

An important object of the present invention is to harmonize the use of the two forms of transportation referred to to facilitate their use at transit sheds by eliminating the necessity for moving motor drays when shifting freight cars.

A further object is to provide a transit shed with what may be termed "dray indents" into which motor drays may be backed to directly receive freight from or to deliver freight to the floor of a transit shed without interfering with the movement of adjacent freight cars.

A further object is to provide a transit shed construction of the character referred to wherein the movement of the drays to and from loading and unloading position is facilitated with minimum interference with the movement of freight cars.

A further object is to provide such a construction wherein the loading of the drays takes place beneath the shelter of the roof of a shed, thus protecting the articles or packages being loaded or unloaded.

Other objects and advantages of the invention will become apparent during the course of the following description.

In the drawings I have shown one embodiment of the invention. In this showing—

Figure 1 is a plan view of a steamship dock, the transit sheds being shown in section, Figure 2 is an enlarged horizontal sectional view through a portion of one of the transit sheds, showing one of the dray indents, and, Figure 3 is a vertical section on line 3—3 of Figure 2.

Referring to Figure 1, a transit shed is illustrated in connection with a steamship dock, the dock being generally indicated by the numeral 10. For the purpose of illustration several ships 11 have been diagrammatically illustrated as being tied up on three sides of the dock. The left hand end of the dock as viewed in Figure 1, is the land end, as will be obvious, and freight is transported to and from the dock from such end thereof.

The transit shed has been indicated as being formed of two longitudinal sections generally designated by the numerals 12 and 13. Each transit shed is provided with outer walls 14 and inner walls 15, each of which is provided with suitable doors 16. The dock is provided outwardly of the walls 14 with railroad tracks 17, and similar tracks 18 are shown as being arranged in pairs and extending between the two sections of the shed. Certain of the tracks have been illustrated as having railroad freight cars 19 in position thereon (see Figures 1 and 3). The pairs of railroad tracks 18 are separated from each other to provide space for the passage of motor drays, and such space is paved substantially throughout its length as indicated by the numeral 20.

Referring to Figure 3, it will be noted that the floor 21 of each transit shed is elevated above the surrounding surface, the level of the shed floor thus being approximately at the level of the floors of freight cars and motor truck bodies. Each transit shed section is provided with a suitable roof 22 completely covering the shed and extending continuously from end to end thereof. Each shed section is provided with a plurality of dray indents 23 in the inner wall 15 thereof. Since the inner edge of each shed roof is continuous from end to end, it will be apparent that each dray indent is sheltered. The paving 20 extends into each indent as indicated by the numeral 24. A dray indicated as a whole by the numeral 25 is indicated in position in Figure 3 of the reference, and a number of such drays are shown diagrammatically in position in the indents in Figure 1. While the dray in Figure 3 is indicated as including a truck 26 and trailer 27, it will be apparent that any form of motor dray may be used for the handling of freight, the floor of the body of the truck or trailer preferably being at the level of the shed floor 21, as previously stated.

Each transit shed section is provided with platforms 28 at its inner side, adjacent the outermost railroad tracks 18. These platforms have their ends adjacent the dray indents terminating angularly as at 29 to facilitate the backing of drays into the indents. The platforms are accessible to the interiors of the transit shed sections through the doors 16 in the inner walls 15.

Freight cars may be shifted back and forth between the tracks of the several pairs. For example, the outer tracks 17 are provided with switches 30 to facilitate the shifting of freight cars between the tracks of such pairs. Similarly, suitable switches 31 are provided between the tracks of each pair 18 and the inner tracks of the pairs 18 are connected by a switch 32. Accordingly cars may be shifted between any of the tracks 18 and only one switch track extends across the central roadway between the pairs of tracks 18.

The transit shed sections are also provided at their ends with platforms 33 and the platforms at the land end of the dock may be reached by trucks by means of ramps 34 which extend from the elevation of the central roadway to the adjacent platforms 33, preferably in alinement with doors 35 in the end walls of the transit sheds. The spaces within the ramps 34 are preferably paved as at 36 to facilitate the backing of drays 25 against the adjacent platforms 33.

The mode of using the transit sheds will be apparent from the foregoing description. Freight is unloaded from ships in the usual manner and deposited in the transit sheds pending the loading of the freight on the freight cars or motor drays. Freight cars may be brought in proximity to the transit sheds on any of the tracks 17 or 18 adjacent the shed sections, the floors of the cars being at the level of the transit shed floor, as previously stated. The handling of freight between the transit sheds and the motor drays may take place either from the inner platforms 33 or from the dray indents, the use of the latter obviously eliminating the necessity for trucking to the inner platforms 33 freight which is located in the transit sheds a substantial distance from such platforms.

Drays are adapted to be driven over the central roadway and backed into any of the dray indents, the drays occupying the position shown in Figure 3 with the rear ends of the truck or trailer bodies arranged adjacent the floor of the shed to directly receive freight therefrom without the necessity of having to lift the packages or articles. Obviously freight may be unloaded from the drays to the transit shed floor with equal facility. It will be noted that when a dray is in position in one of the dray indents, the front end of the dray is completely offset from the adjacent tracks 18, thus permitting the free movement of freight cars back and forth in front of the dray indents while the drays are being loaded and unloaded. Thus the delay and danger incident to the moving of the drays while shifting cars is eliminated.

While one or more drays is being loaded or unloaded, the freight cars may be freely shifted back and forth between the tracks of each pair 18 or between the tracks of the two pairs by means of the switch section 32. Obviously the relatively infrequent use of the switch section 32 will not materially interfere with the passage of trucks along the central roadway. The tracks are arranged approximately at the level of the roadway and other paved portions, thus permitting the drays to be freely moved to and from the dray indents or to positions adjacent the platforms 33. It also will be apparent that while the drays are in position in the indents, the articles or packages of freight being moved to or from the drays will be sheltered by the roof 22, the inner edge of each roof extending from end to end of each shed section over the dray indents, as clearly shown in Figure 3. If it becomes necessary or desirable for any reason to drive drays directly into the sheds, the ramps 34 may be readily used for such purpose.

From the foregoing it will be apparent that the present construction greatly facilitates the handling of freight partly by motor trucks and partly by freight cars, and greatly minimizes the interference usually occuring between the two types of transporting vehicles. Thus articles of freight may be more quickly and efficiently handled, and the element of danger to workers is materially reduced.

It is to be understood that the form of the invention herewith shown and described is to be taken as a preferred example of the same, and that various changes in the shape, size and arrangement of parts may be resorted to without departing from the spirit of the invention or the scope of the subjoined claims.

I claim:

1. In combination, a transfer shed having a floor, a railroad track parallel to one side of said shed and arranged a substantial distance below the level of the floor thereof, said track being arranged in proximity to the adjacent edge of the floor of said shed to facilitate the transferring of freight between said floor and the floor of a car on said track, said side of said shed having an indent extending a substantial distance inwardly from said track, and a highway arranged at the side of said track opposite said shed and substantially at the level of said track, said highway having a laterally extending portion extending into said indent.

2. In combination, a transfer shed having a floor, a railroad track parallel to one side of said shed and arranged a substantial distance below the level of the floor thereof, said track being arranged in proximity to the adjacent edge of the floor of said shed to facilitate the transferring of freight between said floor and the floor of a car on said track, said side of said shed having an indent extending a substantial distance inwardly from said track, and a highway arranged at the side of said track opposite said shed and substantially at the level of said track, said highway having a laterally extending portion extending into said indent, said shed having a roof extending continuously along and over said side thereof and covering at least a substantial portion of said indent.

3. In combination, a transfer shed having a floor, and a wall at one side thereof, and being provided outwardly of said wall with a platform at the level of said floor, and a railroad track adjacent and parallel to one side of said shed and arranged a substantial distance below the level of said floor and said platform, said side of said shed having an indent extending through said platform and through a portion of said floor, said wall of said shed having an open portion coextensive with said indent, the surface adjacent said railroad track being substantially at the level thereof and extending into said indent.

4. In combination, a transfer shed having a floor, and a wall at one side thereof, and being provided outwardly of said wall with a platform at the level of said floor, and a railroad track adjacent and parallel to one side of said shed and arranged a substantial distance below the level of said floor and said platform, said side of said shed having an indent extending through said platform and through a portion of said floor, said wall of said shed having an open portion coextensive with said indent, the surface adjacent said railroad track being substantially at the level thereof and extending into said indent, said shed having a roof extending continuously along and over said side thereof and covering at least the portion of said indent inwardly of said wall.

5. In combination, a transfer shed having a floor, and a wall at one side thereof, and being provided outwardly of said wall with a platform at the level of said floor, a railroad track adjacent and parallel to one side of said shed and arranged a substantial distance below the level of said floor and said platform, said side of said shed having an indent extending through said platform and through a portion of said floor, said wall of said shed having an open portion coextensive with said indent, and a highway arranged at the side of said track opposite said shed and substantially at the level of said track, said highway having a laterally extending portion extending into said indent.

6. In combination, a transfer shed having a floor, and a wall at one side thereof, and being provided outwardly of said wall with a platform at the level of said floor, a railroad track adjacent and parallel to one side of said shed and arranged a substantial distance below the level of said floor and said platform, said side of said shed having an indent extending through said platform and through a portion of said floor, said wall of said shed having an open portion coextensive with said indent, and a highway arranged at the side of said track opposite said shed and substantially at the level of said track, said highway having a laterally extending portion extending into said indent, said shed having a roof extending continuously along and over said side thereof and covering at least the portion of said indent inwardly of said wall.

7. In combination, a pair of transfer sheds having their floors at the same level and their inner walls spaced from and parallel to each other, a railroad track adjacent and parallel to the inner wall of each shed and arranged a substantial distance below the level of the floors thereof, said side of each shed having an indent extending to a substantial extent inwardly from the adjacent track, a highway between and parallel to said tracks and substantially at the level thereof, said highway having a laterally extending portion extending into each indent, and a switch connecting said railroad tracks.

ERNEST C. GRIBBLE.